(12) United States Patent
Zhen

(10) Patent No.: US 8,009,413 B2
(45) Date of Patent: Aug. 30, 2011

(54) ELECTRONIC DEVICE ASSEMBLY

(75) Inventor: Nian-Feng Zhen, Shenzhen (CN)

(73) Assignees: Hong Fu Jin Precision Industry (ShenZhen) Co., Ltd., Shenzhen, Guangdong Province (CN); Hon Hai Precision Industry Co., Ltd., Tu-Cheng, New Taipei (TW)

( * ) Notice: Subject to any disclaimer, the term of this patent is extended or adjusted under 35 U.S.C. 154(b) by 82 days.

(21) Appl. No.: 12/610,381

(22) Filed: Nov. 2, 2009

(65) Prior Publication Data

US 2011/0019343 A1    Jan. 27, 2011

(30) Foreign Application Priority Data

Jul. 23, 2009 (CN) .......................... 2009 1 0304759

(51) Int. Cl.
*H05K 7/16* (2006.01)

(52) U.S. Cl. ......... 361/679.22; 361/679.15; 361/679.01; 248/917

(58) Field of Classification Search ............. 361/679.08, 361/679.09, 679.21, 679.22, 679.26, 679.27, 361/679.15, 679.11; 248/917–924
See application file for complete search history.

(56) References Cited

U.S. PATENT DOCUMENTS

| 6,536,728 | B1 * | 3/2003 | Hagglund et al. ......... 248/286.1 |
| 2006/0075934 | A1 * | 4/2006 | Ram .............................. 108/44 |

* cited by examiner

*Primary Examiner* — Jinhee Lee
*Assistant Examiner* — Ingrid Wright
(74) *Attorney, Agent, or Firm* — Altis Law Group, Inc.

(57) ABSTRACT

An electronic device includes a front cover, a keyboard, and a sliding apparatus. The sliding apparatus is slidably coupled to the front cover. The keyboard is pivotally coupled to the sliding apparatus. By pulling the sliding apparatus and rotating the keyboard, the keyboard is foldable on the front cover.

5 Claims, 5 Drawing Sheets

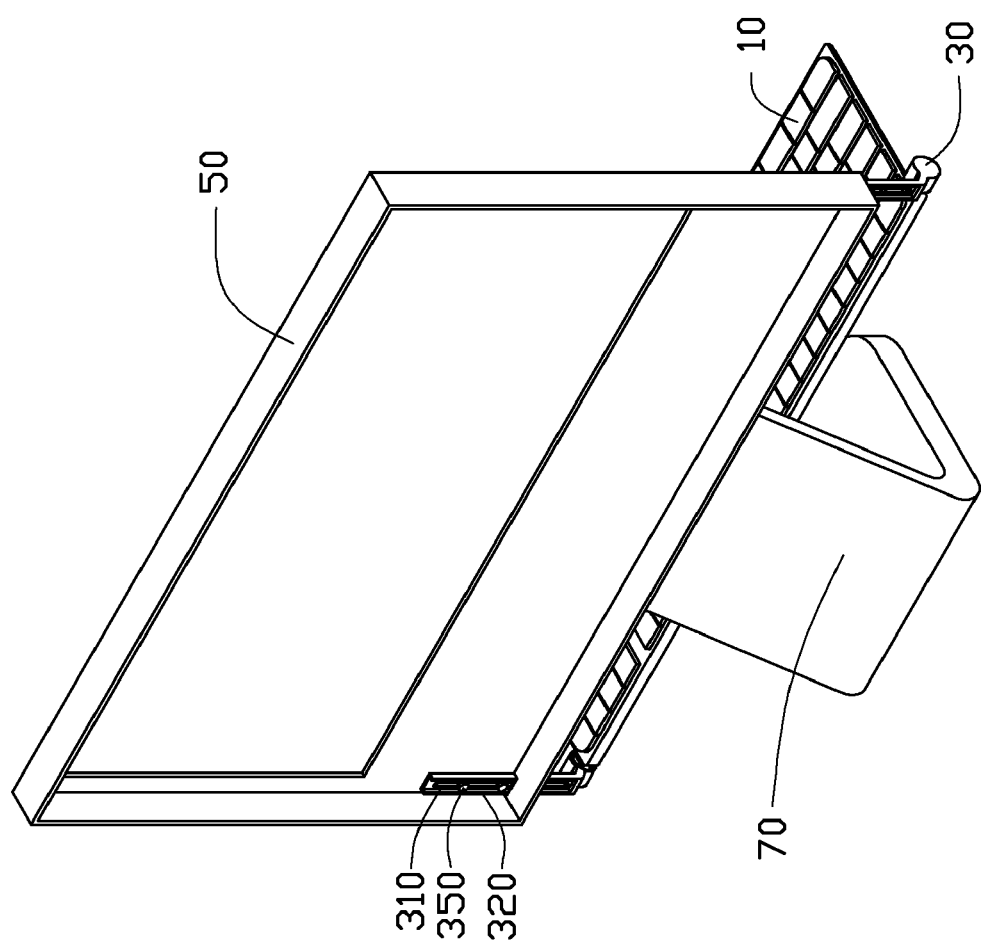

ELECTRONIC DEVICE ASSEMBLY

BACKGROUND

1. Technical Field

The disclosure generally relates to electronic device assemblies, and particularly to an electronic device assembly having a foldable keyboard.

2. Description of Related Art

Desktop computer keyboards are usually a separate peripheral, they occupy space and collect dust, and furthermore are a hassle when moving the whole computer system. Therefore, what is needed is an electronic device assembly having a keyboard coupled thereto and foldable thereon.

BRIEF DESCRIPTION OF THE DRAWINGS

The components of the drawings are not necessarily drawn to scale, the emphasis instead being placed upon clearly illustrating the principles of the embodiments of an electronic device assembly. Moreover, in the drawings, like reference numerals designate corresponding parts throughout several views.

FIG. 5 is a perspective view of the electronic device assembly of FIG. 1 while the keyboard is pulled down.

DETAILED DESCRIPTION

Figure 1:
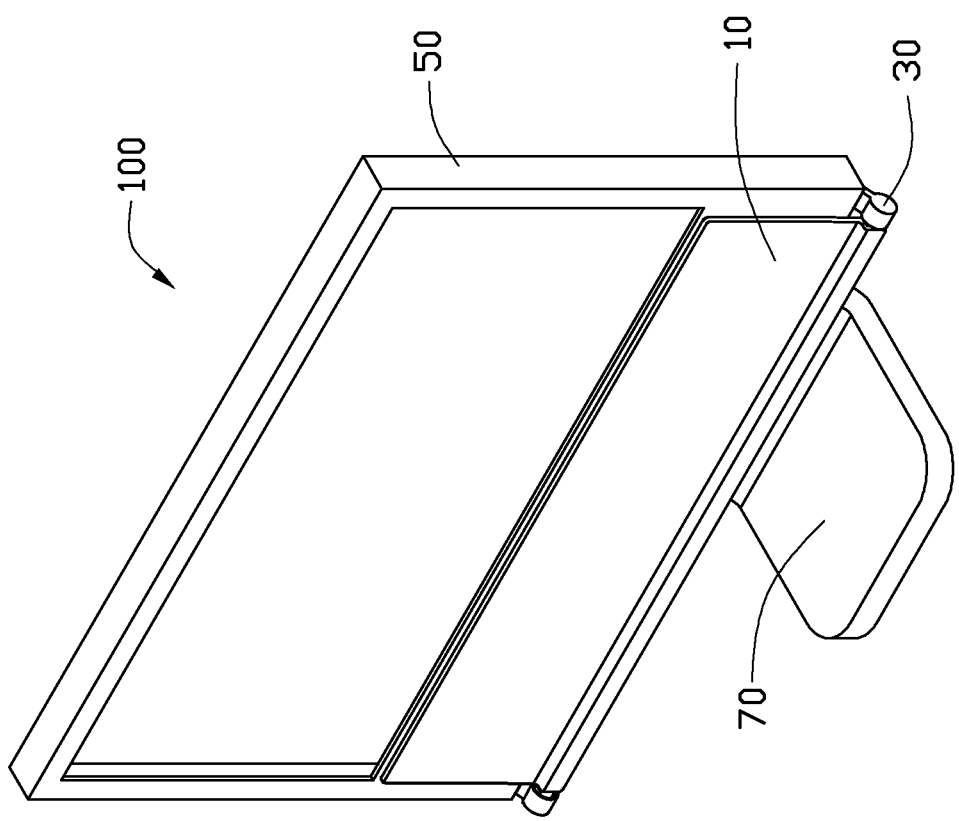
FIG. 1 is a perspective view of an electronic device assembly having a keyboard and a sliding apparatus in accordance with one embodiment.

Referring to FIG. 1, an electronic device assembly 100 includes a keyboard 10, two sliding apparatuses 30, a front cover 50, and a base 70. The sliding apparatuses 30 are slidably coupled to the front cover 50. The keyboard 10 is rotateably coupled to the sliding apparatuses 30. The base 70 is configured to support the front cover 50 on a surface such as a table, etc. By pulling the sliding apparatuses 30 and rotating the keyboard 10, the keyboard 10 is foldable with respect to the front cover 50. Furthermore, the electronic device assembly 100 also includes a display unit, such as a liquid crystal display (LCD), circuit boards, and a rear cover for covering the backside of the front cover 50, and other components, all of them are not shown in the drawings.

Figure 2:
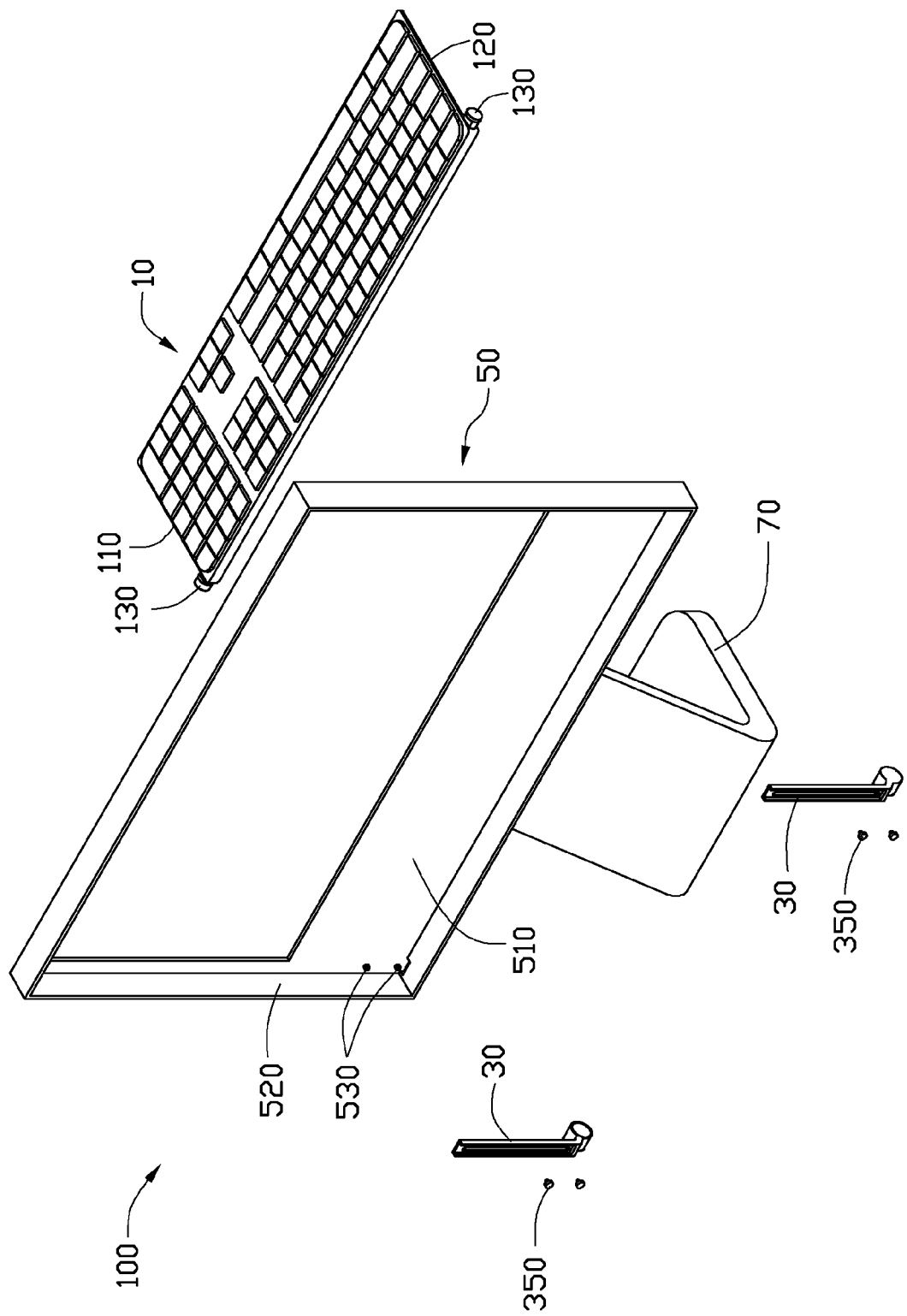
FIG. 2 is an exploded view of the electronic device of FIG. 1, but viewed from another aspect.
Figure 3:
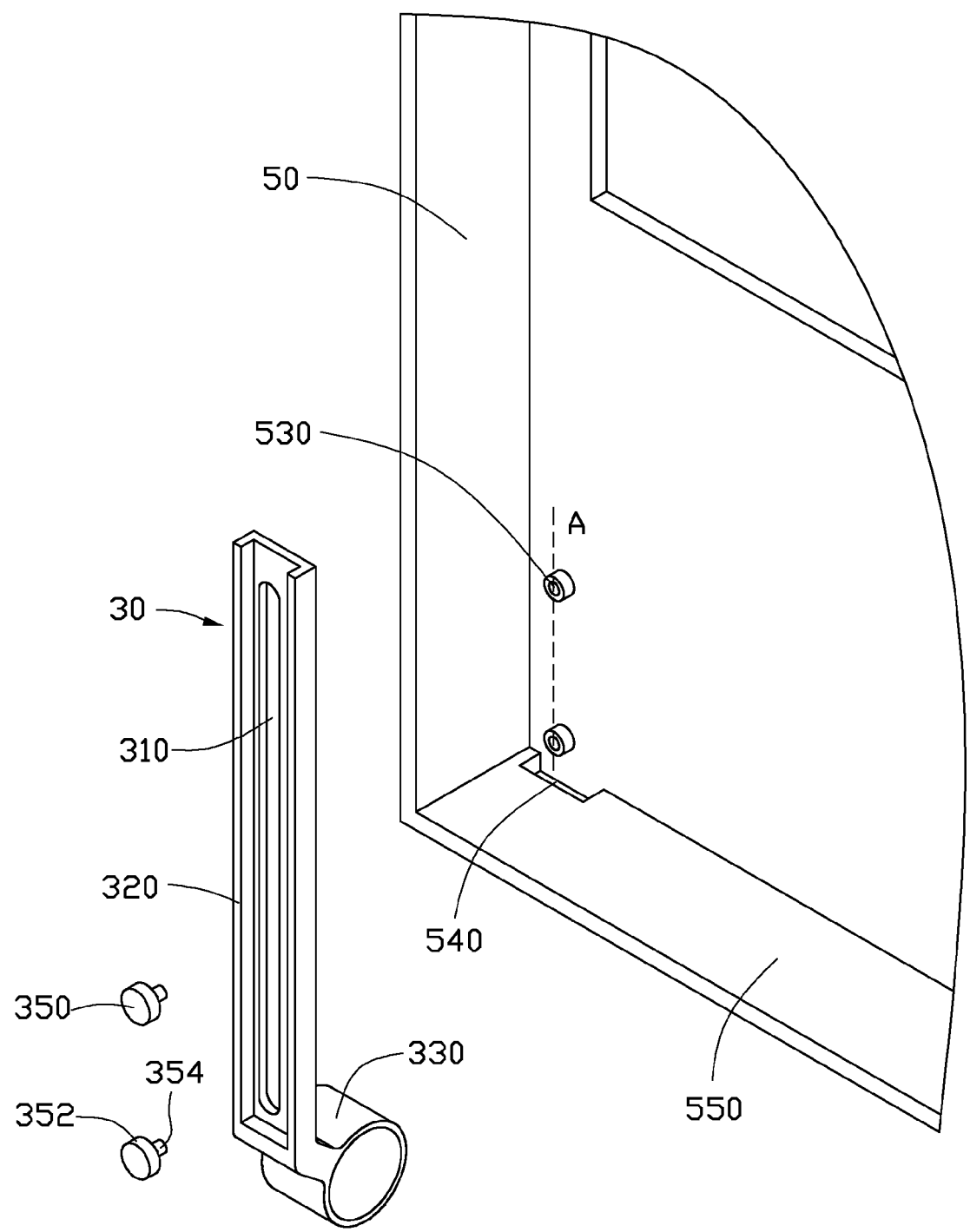
FIG. 3 is a partial exploded view of the electronic device of FIG. 1.

Referring also to FIGS. 2-3, the keyboard 10 is substantially rectangular. The keyboard 10 includes a first sidewall 110, a second sidewall 120, and two shafts 130. The first sidewall 110 is parallel to the second sidewall 120. The two shafts 130 coaxially extend from the ends of the first sidewall 110 and the second sidewall 120 respectively.

The front cover 50 includes a panel board 510, two parallel sidewalls 520 extending from the panel board 510, and a bottom sidewall 550 (see FIG. 3). The bottom sidewall 550 extends from the panel board 510 perpendicular to the two parallel sidewalls 520. A first pair of fixing members 530 is arranged on the panel board 510 and is adjacent to one of the parallel sidewalls 520. A second pair of fixing members 530 is arranged on the panel board 510 and is adjacent to the other one of the parallel sidewalls 520. Two openings 540 are defined in the bottom sidewall 550 and are adjacent to opposite ends of the bottom sidewall 550. The first two fixing members 530 and one of the openings 540 are aligned in a straight line A (see FIG. 3), and the other two fixing members 530 and the other opening 540 are aligned in another straight line (not shown). The straight line A is parallel to the parallel sidewalls 520.

Each sliding apparatus 30 includes a sliding rail 320 and two securing members 350. The sliding rail 320 is slidably coupled to the front cover 50 by engaging the securing members 350 with the fixing members 530. An elongated strip guiding slot 310 is defined in the sliding rail 320. A round recess 330 is defined at an end of the sliding rail 320. The round recesses 330 are configured to receive the shafts 130, such that the keyboard 10 is rotateably coupled to the sliding rails 320. Each securing member 350 includes a first column 352, and a second column 354. The diameter of the first column 352 is longer than that of the second column 354 and is also longer than the width of the elongated strip guiding slot 310, and the diameter of the second column 354 is slightly less than the width of the elongated strip guiding slot 310.

In assembly, the keyboard 10 is pivotally coupled to the sliding apparatus 30 by engaging the shafts 130 with the corresponding round recesses 330. The sliding rails 320 extend through the openings 540. The two fixing members 530 are accommodated in the elongated strip guiding slot 310. The two securing members 350 extend through the elongated strip guiding slot 310 and engage with the fixing members 530, such that the sliding rails 320 are slidably coupled to the front cover 50. Furthermore, by operationally controlling the securing members 350 to engage with the fixing members 530, a desired force of sliding friction (not shown) is generated. In the embodiment, the force of sliding friction is larger than the combined weight of the keyboard 10 and the sliding apparatus 30, thus, the sliding apparatus 30 can be located at a desired position.

After assembly, the keyboard 10 is pivotally coupled to the sliding apparatus 30. The sliding apparatus 30 is slidably coupled to the front cover 50. As two fixing members 530 are accommodated in each elongated strip guiding slot 310, and the diameter of the first columns 352 is larger than the width of the elongated strip guiding slot 310, the sliding apparatus 30 can only slide upward and downward along the straight line A.

Referring to FIG. 1, when the keyboard 10 is not used, the sliding apparatus 30 may be moved upward so that the sliding apparatus 30 is housed in the front cover 50, then, the keyboard 10 may be folded on the front cover 50.

Figure 4:
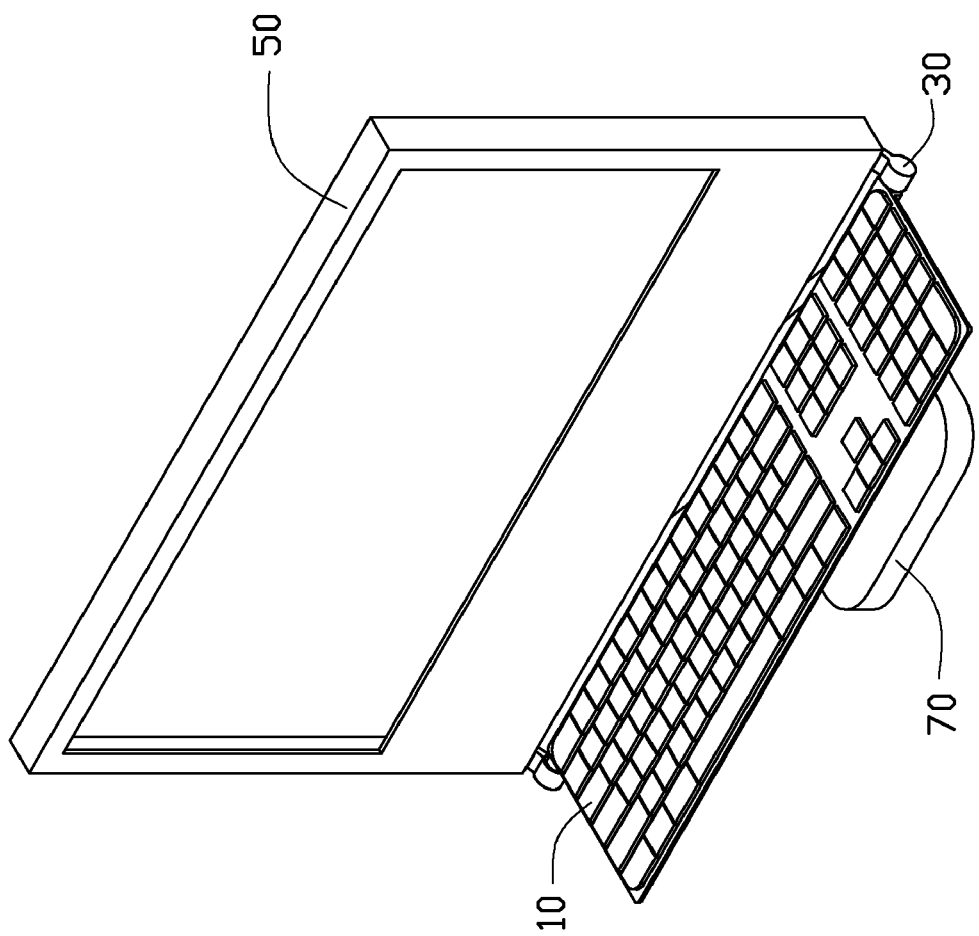
FIG. 4 is a perspective view of the electronic device assembly of FIG. 1 while the keyboard is unfolded.

Referring to FIGS. 4-5, to use the keyboard 10, the keyboard 10 may be folded away from the front cover 50, and further move the sliding apparatus 30 downward to locate the keyboard 10 on a supporting area, for example, a desk (not shown).

Therefore, by pulling the sliding apparatus 30 and rotating the keyboard 10, the keyboard 10 is foldable on the front cover 50. When the keyboard 10 is not used, a user can fold the keyboard 10 on the front cover 50 to avoid dusts falling thereinto.

Although the present disclosure has been specifically described on the basis of the embodiments thereof, the disclosure is not to be construed as being limited thereto. Various changes or modifications may be made to the embodiments without departing from the scope and spirit of the disclosure.

What is claimed is:

1. An electronic device assembly, comprising:
   a front cover;
   a keyboard comprising a shaft;
   at least one fixing member arranged on the front cover;
   at least one securing member; and a sliding apparatus comprising a sliding rail, wherein an elongated guiding slot is defined in the sliding rail, and a recess is defined at an end of the sliding rail;

wherein the keyboard is pivotally coupled to the sliding apparatus via engaging the shaft with the recess, the sliding apparatus is slidably coupled to the front cover by extending the at least one securing member through the elongated guiding slot to engage with the at least one fixing member, the at least one securing member engaging with the at least one fixing member causes the sliding apparatus to slide downward and upward relative to the front cover, and the downward and upward slide of the sliding apparatus is able to cause the keyboard to slide downward and upward relative to the front cover as the keyboard is pivotally coupled to the sliding apparatus via engaging the shaft with the recess.

2. The electronic device assembly of claim 1, wherein the front cover comprises a panel board, a bottom sidewall, and two sidewalls, the at least one fixing member is arranged at the panel board and is adjacent to one of the sidewalls, at least one opening is defined at an opposite end of the bottom sidewall, and the at least one fixing member and the at least one opening are aligned in a straight line parallel to the sidewalls, the sliding rail extends through the at least one opening.

3. The electronic device assembly of claim 2, wherein each of the at least one securing member comprises a bigger column portion, and a smaller column portion, the diameter of the bigger column portion is longer than the width of the elongated guiding slot, the smaller column portion extends through the elongated guiding slot, and the diameter of the smaller column portion is less than the width of the elongated guiding slot.

4. An electronic device assembly, comprising:
a front cover;
a keyboard;
at least one securing member; and
a sliding apparatus slidably coupled to the front cover via the at least one securing member, the keyboard pivotally coupled to the sliding apparatus;
wherein the keyboard is foldably coupled to the front cover in a manner allowing the keyboard to rotate at an angle and position at different heights relative to the front cover in association with the sliding apparatus;
wherein the keyboard is capable of sliding relative to the front cover from a first position to a second position, wherein at the first position the keyboard is capable of being rotated to substantially fold on the front cover, wherein at the second position the keyboard is capable of being rotated for facilitating a user to input commands or instructions to the electronic device assembly.

5. The electronic device assembly of claim 4, further comprising: at least one fixing member, the at least one fixing member being adjustably engaging with the at least one securing member for adjusting a height of the sliding apparatus relative to a supporting surface at the second position, allowing the user to adjust an optimal angle of the keyboard relative to the supporting surface according to the user preference.

* * * * *